United States Patent
Mukherjee et al.

(10) Patent No.: US 9,501,425 B2
(45) Date of Patent: Nov. 22, 2016

(54) TRANSLATION LOOKASIDE BUFFER MANAGEMENT

(71) Applicant: Cavium, Inc., San Jose, CA (US)

(72) Inventors: Shubhendu S. Mukherjee, Southborough, MA (US); David Asher, Sutton, MA (US); Mike Bertone, Marlborough, MA (US); Bradley Dobbie, Cambridge, MA (US); Thomas Hummel, Holliston, MA (US)

(73) Assignee: Cavium, Inc., San Jose, CA (US)

( * ) Notice: Subject to any disclaimer, the term of this patent is extended or adjusted under 35 U.S.C. 154(b) by 70 days.

(21) Appl. No.: 14/541,498

(22) Filed: Nov. 14, 2014

(65) Prior Publication Data

US 2016/0140047 A1    May 19, 2016

(51) Int. Cl.
 *G06F 12/1027* (2016.01)
 *G06F 12/1009* (2016.01)
 *G06F 12/10* (2016.01)

(52) U.S. Cl.
 CPC ....... *G06F 12/1027* (2013.01); *G06F 12/1009* (2013.01); *G06F 2212/657* (2013.01); *G06F 2212/68* (2013.01); *G06F 2212/683* (2013.01)

(58) Field of Classification Search
 CPC .......... G06F 12/1027; G06F 12/1009; G06F 2212/657; G06F 2212/683
 See application file for complete search history.

(56) References Cited

U.S. PATENT DOCUMENTS

| | | | |
|---|---|---|---|
| 5,906,001 A | 5/1999 | Wu et al. | |
| 6,119,204 A * | 9/2000 | Chang | G06F 12/1027 711/141 |
| 7,073,043 B2 | 7/2006 | Arimilli et al. | |
| 7,617,378 B2 | 11/2009 | Arimilli et al. | |
| 7,853,754 B1 | 12/2010 | Agarwal et al. | |
| 7,865,670 B2 | 1/2011 | Cota-Robles et al. | |
| 8,392,661 B1 | 3/2013 | Metcalf | |
| 8,832,381 B2 | 9/2014 | Hunt | |
| 2011/0016289 A1 | 1/2011 | Ableidinger | |
| 2015/0134931 A1 | 5/2015 | Mukherjee et al. | |
| 2016/0140060 A1 | 5/2016 | Mukherjee et al. | |
| 2016/0140061 A1 | 5/2016 | Mukherjee et al. | |

* cited by examiner

*Primary Examiner* — Eric S Cardwell
(74) *Attorney, Agent, or Firm* — Occhiuti & Rohlicek LLP

(57) ABSTRACT

Each of multiple translation lookaside buffers (TLBs) is associated with a corresponding processing element. A first TLB invalidation (TLBI) instruction is issued at a first processing element, and sent to a second processing element. An element-specific synchronization instruction is issued at the first processing element. A synchronization command is broadcast, and received at the second processing element. The element-specific synchronization instruction prevents issuance of additional TLBI instructions at the first processing element until an acknowledgement in response to the synchronization command is received at the first processing element. After completion of any TLBI instructions issued at the second processing element before the synchronization command was received, the acknowledgement is sent from the second processing element to the first processing element, indicating that any TLBI instructions issued at the second processing element before the synchronization command was received at the second processing element are complete.

26 Claims, 13 Drawing Sheets

TRANSLATION LOOKASIDE BUFFER MANAGEMENT

BACKGROUND

This invention relates to management of translation lookaside buffers in computing systems.

Many computing systems utilize virtual memory systems to allow programmers to access memory addresses without having to account for where the memory addresses reside in the physical memory hierarchies of the computing systems. To do so, virtual memory systems maintain a mapping of virtual memory addresses, which are used by the programmer, to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address may be located in a page of a large virtual address space that translates to a page of physical memory that is not currently resident in main memory (i.e., a page fault), so that page is then copied into main memory.

Modern computing systems include one or more translation lookaside buffers (TLBs) which are caches for the page table, used by the virtual memory system to improve the speed of virtual to physical memory address translation. Very generally, a TLB includes a number of entries from the page table, each entry including a mapping from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory.

SUMMARY

In one aspect, in general, a method for managing a plurality of translation lookaside buffers, each translation lookaside buffer being associated with a corresponding processing element of a plurality of processing elements, includes: issuing a first translation lookaside buffer invalidation instruction at a first processing element of the plurality of processing elements, and sending the first translation lookaside buffer invalidation instruction to a second processing element of the plurality of processing elements; receiving translation lookaside buffer invalidation instructions, including the first translation lookaside buffer invalidation instruction, at the second processing element; issuing an element-specific synchronization instruction at the first processing element, including broadcasting a synchronization command, the element-specific synchronization instruction preventing issuance of additional translation lookaside buffer invalidation instructions at the first processing element until an acknowledgement in response to the synchronization command is received at the first processing element; receiving the synchronization command at the second processing element; and after completion of any translation lookaside buffer invalidation instructions, including the first translation lookaside buffer invalidation instruction, issued at the second processing element before the synchronization command was received at the second processing element, sending the acknowledgement from the second processing element to the first processing element, the acknowledgement indicating that any translation lookaside buffer invalidation instructions, including the first translation lookaside buffer invalidation instruction, issued at the second processing element before the synchronization command was received at the second processing element are complete.

Aspects can include one or more of the following features.

The acknowledgement indicates that a plurality of translation lookaside buffer invalidation instructions issued at the second processing element before the synchronization command was received at the second processing element are complete.

Two or more translation lookaside buffer invalidation instructions of the plurality of translation lookaside buffer invalidation instructions were received at the second processing element from other processing elements of the plurality of processing elements.

The acknowledgement further indicates that any write operations present in a write buffer of the second processing element prior to the synchronization command being received at the second processing element are complete.

Sending the first translation lookaside buffer invalidation instruction to the second processing element includes sending the first translation lookaside buffer invalidation instruction to a broadcast element and subsequently sending the first translation lookaside buffer invalidation instruction from the broadcast element to the second processing element.

The broadcast element maintains a number of translation lookaside buffer invalidation instructions received since the last synchronization command was received.

The method further includes receiving a second synchronization command at the broadcast element and determining whether or not to send the second synchronization command to one or more processing elements of the plurality of processing elements based on the number of translation lookaside buffer invalidation instructions received since the last synchronization command was received.

The method further includes sending the second synchronization command to the one or more processing elements of the plurality of processing elements if the number of translation lookaside buffer invalidation instructions received since the last synchronization command was received is greater than zero and suppressing the second synchronization command if the number of translation lookaside buffer invalidation instructions received since the last synchronization command was received is equal to zero.

The broadcast element increments the number of translation lookaside buffer invalidation instructions received since the last synchronization command was received upon receiving the first translation lookaside buffer invalidation instruction.

Broadcasting the synchronization command includes sending the synchronization command to the broadcast element and subsequently sending the synchronization command from the broadcast element to the second processing element.

The broadcast element resets the number of translation lookaside buffer invalidation instructions received since the last synchronization command was received to zero upon receiving the synchronization command.

The method further includes sending the synchronization instruction from the broadcast element to a second broadcast element, wherein the second broadcast element subsequently sends the synchronization instruction to one or more processor elements of a second plurality of processor elements.

In another aspect, in general, an apparatus includes: a plurality of processing elements, each processing element being associated with a corresponding translation lookaside buffer; wherein a first processing element of the plurality of processing elements is configured to issue a first translation lookaside buffer invalidation instruction, and send the first translation lookaside buffer invalidation instruction to a second processing element of the plurality of processing elements; wherein the second processing element is configured to receive translation lookaside buffer invalidation instructions, including the first translation lookaside buffer invalidation instruction; wherein the first processing element is configured to issue an element-specific synchronization instruction, including broadcasting a synchronization command, the element-specific synchronization instruction preventing issuance of additional translation lookaside buffer invalidation instructions at the first processing element until an acknowledgement in response to the synchronization command is received at the first processing element; wherein the second processing element is configured to receive the synchronization command; and wherein, after completion of any translation lookaside buffer invalidation instructions, including the first translation lookaside buffer invalidation instruction, issued at the second processing element before the synchronization command was received at the second processing element, the second processing element is configured to send the acknowledgement to the first processing element, the acknowledgement indicating that any translation lookaside buffer invalidation instructions, including the first translation lookaside buffer invalidation instruction, issued at the second processing element before the synchronization command was received at the second processing element are complete.

Aspects can include one or more of the following features.

The acknowledgement indicates that a plurality of translation lookaside buffer invalidation instructions issued at the second processing element before the synchronization command was received at the second processing element are complete.

Two or more translation lookaside buffer invalidation instructions of the plurality of translation lookaside buffer invalidation instructions were received at the second processing element from other processing elements of the plurality of processing elements.

The acknowledgement further indicates that any write operations present in a write buffer of the second processing element prior to the synchronization command being received at the second processing element are complete.

Sending the first translation lookaside buffer invalidation instruction to the second processing element includes sending the first translation lookaside buffer invalidation instruction to a broadcast element and subsequently sending the first translation lookaside buffer invalidation instruction from the broadcast element to the second processing element.

The broadcast element maintains a number of translation lookaside buffer invalidation instructions received since the last synchronization command was received.

The broadcast element is configured to receive a second synchronization command and determine whether or not to send the second synchronization command to one or more processing elements of the plurality of processing elements based on the number of translation lookaside buffer invalidation instructions received since the last synchronization command was received.

The broadcast element is further configured to send the second synchronization command to the one or more processing elements of the plurality of processing elements if the number of translation lookaside buffer invalidation instructions received since the last synchronization command was received is greater than zero and suppress the second synchronization command if the number of translation lookaside buffer invalidation instructions received since the last synchronization command was received is equal to zero.

The broadcast element increments the number of translation lookaside buffer invalidation instructions received since the last synchronization command was received upon receiving the first translation lookaside buffer invalidation instruction.

Broadcasting the synchronization command includes sending the synchronization command to the broadcast element and subsequently sending the synchronization command from the broadcast element to the second processing element.

The broadcast element resets the number of translation lookaside buffer invalidation instructions received since the last synchronization command was received to zero upon receiving the synchronization command.

The broadcast element is configured to send the synchronization instruction to a second broadcast element, wherein the second broadcast element subsequently sends the synchronization instruction to one or more processor elements of a second plurality of processor elements.

Aspects can have one or more of the following advantages.

Among other advantages, aspects synchronize portions of a number of translation lookaside buffers while reducing a number of acknowledgement messages sent between processing elements over a processor bus.

Other features and advantages of the invention will become apparent from the following description, and from the claims.

DESCRIPTION

1 Overview

For a variety of reasons, a mapping between a virtual address and a physical address may become invalid. If the mapping is stored as an entry in a TLB, the entry in the TLB must be invalidated to avoid returning incorrect data to a program that uses the virtual address. In some examples, computing systems provide an instruction for invalidating TLB entries, sometimes referred to as a TLB invalidate instruction (TLBI). When a mapping between a virtual address and a physical address becomes invalid, a TLBI instruction is issued for the mapping. When the TLBI instruction for the mapping is received, any entry in the TLB corresponding to the mapping is invalidated (or removed).

In computing systems with multiple processing elements (e.g., cores of a multi-core processor), certain TLBI instructions issued at a first processing element may be broadcast to some or all of the other, remote processing elements in the computing system. In some situations, there is a need to synchronize the multiple processing elements by suspending processing at the first processing element until all of the TLBI instructions that it has broadcast have completed at all of the remote processing elements. Approaches described herein aim to efficiently accomplish this synchronization.

2 Computing System

Figure 1:
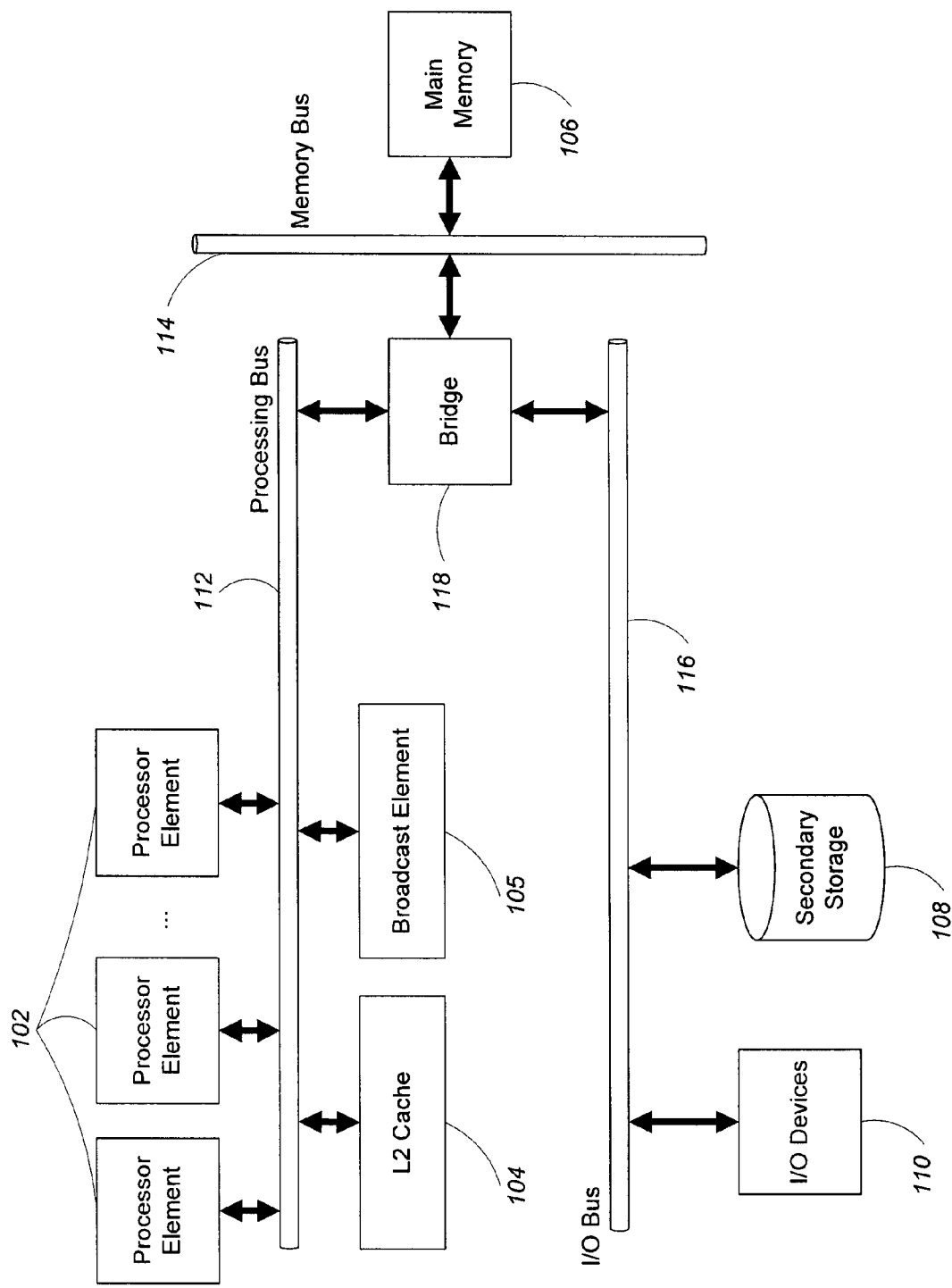
FIG. 1 is a computing system.

Referring to FIG. 1, a computing system 100 includes a number of processing elements 102, a level 2 (L2) cache 104 (e.g., SRAM), a broadcast element 105, a main memory 106 (e.g., DRAM), a secondary storage device (e.g., a magnetic disk) 108, and one or more input/output (I/O) devices 110 (e.g., a keyboard or a mouse). The processing elements 102, the L2 cache 104, and the broadcast element 105 are connected to a processing bus 112, the main memory 106 is connected to a memory bus 114, and the I/O devices 110 and the secondary storage device 108 are connected to an I/O bus 116. The processing bus 112, the memory bus 114, and the I/O bus 116 are connected to one another via a bridge 118.

Very generally, the broadcast element 105 allows for any one of the processor elements 102 to broadcast commands or instructions to other of the processing elements 102 over the processing bus 112.

2.1 Memory Hierarchy

In general, the processing elements 102 execute instructions of one or more computer programs, including reading processor instructions and data from memory included in the computing system 100. As is well known in the art, the various memory or storage devices in the computing system 100 are organized into a memory hierarchy based on a relative latency of the memory or storage devices. One example of such a memory hierarchy has processor registers (not shown) at the top, followed by a level 1(L1) cache (not shown), followed by the L2 cache 104, followed by the main memory 106, and finally followed by the secondary storage 108. When a given processing element 102 tries to access a memory address, each memory or storage device in the memory hierarchy is checked, in order from the top of the memory hierarchy down, to determine whether the data for the memory address is stored in the storage device or memory device.

For example, for a first processing element 348 of the processing elements 102 to access a memory address for data stored only in the secondary storage device 108, the processing element first determines whether the memory address and data are stored in its L1 cache. Since the memory address and data are not stored in its L1 cache, a cache miss occurs, causing the processor to communicate with the L2 cache 140 via that processing bus 112 to determine whether the memory address and data are stored in the L2 cache 140. Since the memory address and data are not stored in the L2 cache 140, another cache miss occurs, causing the L2 cache 140 to communicate with the main memory 106 via the processing bus 112, bridge 110, and memory bus 118 to determine whether the memory address and data are stored in the main memory 106. Since the memory address and data are not stored in the main memory 106, another miss occurs (also called a "page fault"), causing the main memory 106 to communicate with the secondary storage device 108 via the memory bus 114, the bridge 118, and the I/O bus 116 to determine whether the memory address and data are stored in the secondary storage device 108. Since the memory address and data are stored in the secondary storage device 108, the data is retrieved from the secondary storage device 108 and is returned to the processing element via the I/O bus 116, the bridge 118, and the processing bus 112. The memory address and data maybe cached in any number of the memory or storage devices in the memory hierarchy such that it can be accessed more readily in the future.

2.2 Processing Elements

Figure 2:
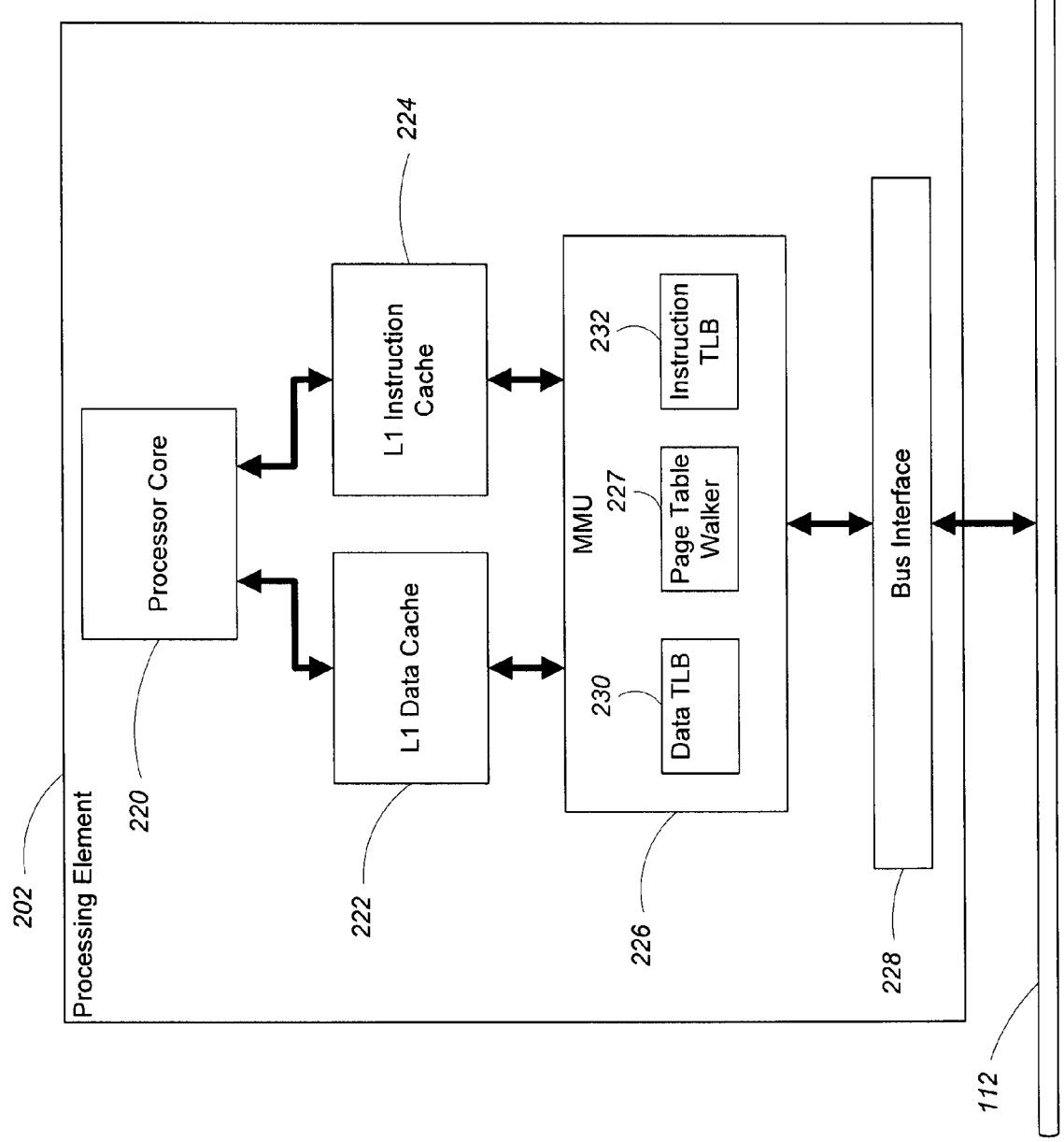
FIG. 2 is a processing element coupled to a processing bus.

Referring to FIG. 2, one example of a processing element 202 of the processing elements 102 of FIG. 1 is connected to the processing bus 112. The processing element 202 includes a processor core 220, an L1 data cache 222, an L1 instruction cache 224, a memory management unit (MMU) 226, and a bus interface 228. The processor core 220 (also called simply a "core") is an individual processor (also called a central processing unit (CPU)) that, together with other processor cores, coordinate to form a multi-core processor. The MMU 226 includes a page table walker 227, a data translation lookaside buffer (TLB) 230, and an instruction translation lookaside buffer (TLB) 232, each of which is described in more detail below. Note that, in some examples, distinction between the data TLB 230 and the instruction TLB 232 is logical and the two TLBs 230, 232 share the same structure or are combined into a single TLB.

Very generally, the processor core 220 executes instructions which, in some cases, require access to memory addresses in the memory hierarchy of the computing system 100. The instructions executed by the processing element 202 of FIG. 2 use virtual memory addresses.

2.2.1 Data Memory Access

When the processor core 220 requires access to a virtual memory address associated with data, the processor core 220 sends a memory access request for the virtual memory address to the L1 data cache 222. The L1 data cache 222 stores a limited number of recently or commonly used data values tagged by their virtual memory addresses. If the L1 data cache 222 has an entry for the virtual memory address (i.e., a cache hit), the data associated with the virtual memory address is returned to the processor core 220 without requiring any further memory access operations in the memory hierarchy. Alternatively, in some implementations, the L1 data cache 222 tags entries by their physical memory addresses, which requires address translation even for cache hits.

If the L1 data cache 222 does not have an entry for the virtual memory address (i.e., a cache miss), the memory access request is sent to the MMU 226. In general, the MMU 226 uses the data TLB 230 to translate the virtual memory address to a corresponding physical memory address and sends a memory access request for the physical memory address out of the processor 202 to other elements of the memory hierarchy via the bus interface 228. The page table walker 227 handles retrieval of mappings that are not stored in the data TLB 230, by accessing the full page table that is stored (potentially hierarchically) in one or more levels of memory. The page table stores a complete set of mappings between virtual memory addresses and physical memory addresses that the page table walker 227 accesses to translate the virtual memory address to a corresponding physical memory address.

To speed up the process of translating the virtual memory address to the physical memory address, the data TLB 230 includes a number of recently or commonly used mappings between virtual memory addresses and physical memory addresses. If the data TLB 230 has a mapping for the virtual memory address, a memory access request for the physical memory address associated with the virtual memory address (as determined from the mapping stored in the data TLB 230) is sent out of the processor 202 via the bus interface 228.

If the data TLB 230 does not have a mapping for the for the virtual memory address (i.e., a TLB miss), the page table walker 227 traverses (or "walks") the levels of the page table to determine the physical memory address associated with the virtual memory address, and a memory request for the physical memory address (as determined from the mapping stored in the page table) is sent out of the processor 202 via the bus interface 228.

In some examples, the data TLB 230 and the page table are accessed in parallel to ensure that no additional time penalty is incurred when a TLB miss occurs.

Since the L1 data cache 222 and the data TLB 230 can only store limited number of entries, cache management algorithms are required to ensure that the entries stored in the L1 data cache 222 and the data TLB 230 are those that are likely to be re-used multiple times. Such algorithms evict and replace entries stored in the L1 data cache 222 and the data TLB 230 based on a criteria such as a least recently used criteria.

2.2.2 Instruction Memory Access

When the processor core 220 requires access to a virtual memory address associated with processor instructions, the processor core 220 sends a memory access request for the virtual memory address to the L1 instruction cache 224. The L1 instruction cache 224 stores a limited number of processor instructions tagged by their virtual memory addresses. If the L1 instruction cache 224 has an entry for the virtual memory address (i.e., a cache hit), the processor instruction associated with the virtual memory address is returned to the processor core 220 without requiring any further memory access operations in the memory hierarchy. Alternatively, in some implementations, the L1 instruction cache 224 tags entries by their physical memory addresses, which requires address translation even for cache hits.

However, if the L1 instruction cache 224 does not have an entry for the virtual memory address (i.e., a cache miss), the memory access request is sent to the MMU 226. In general, the MMU 226 uses the instruction TLB to translate the virtual memory address to a corresponding physical memory address and sends a memory access request for the physical memory address out of the processor 202 to other elements of the memory hierarchy via the bus interface 228. As is noted above, this translation is accomplished using the page table walker 227, which handles retrieval of mappings between virtual memory addresses and physical memory addresses from the page table.

To speed up the process of translating the virtual memory address to the physical memory address, the instruction TLB 232 includes a number of recently or commonly used mappings between virtual memory addresses and physical memory addresses. If the instruction TLB 232 has a mapping for the virtual memory address, a memory access request for the physical memory address associated with the virtual memory address (as determined from the mapping stored in the instruction TLB 232) is sent out of the processor 202 via the bus interface 228.

If the instruction TLB 232 does not have a mapping for the for the virtual memory address (i.e., a TLB miss), the page table walker 227 walks the page table to determine the physical memory address associated with the virtual memory address, and a memory request for the physical memory address (as determined from the mapping stored in the page table) is sent out of the processor 202 via the bus interface 228.

In some examples, the instruction TLB 232 and the page table are accessed in parallel to ensure that no additional time penalty is incurred when a TLB miss occurs.

Since the L1 instruction cache 224 and the instruction TLB 232 can only store a limited number of entries, cache management algorithms are required to ensure that the mappings stored in the L1 instruction cache 224 and the instruction TLB 232 are those that are likely to be re-used multiple times. Such algorithms evict and replace mappings stored in the L1 instruction cache 224 and the instruction TLB 232 based on a criteria such as a least recently used criteria.

2.3 Translation Lookaside Buffer Invalidation (TLBI) Instructions

In some examples, the computing system's virtual memory system may change its mappings between virtual memory addresses and physical memory addresses. In such cases, translation lookaside buffer invalidation instructions (TLBIs) for the virtual memory addresses are issued (e.g., by an operating system or by a hardware entity) to the TLBs in the computing system (i.e., the data TLB 230 and instruction TLB 232 of each processing element 202).

In some examples, a TLBI instruction includes a virtual memory address and causes invalidation of any TLB entries associated with the virtual memory address. That is, when a TLB receives a TLBI for a given virtual memory address, any entries in the TLB storing mappings between the given virtual memory address and a physical memory address are invalidated. It is noted that, while TLBI instructions generally include a virtual memory address for invalidation as an argument, in some examples, for the sake of simplicity, TLBI instructions are described herein as including a mapping for invalidation as an argument. In some examples, a TLBI instruction includes context information such as a process identifier, a virtual machine identifier, or an exception level.

2.3.1 Broadcast TLBI Instructions

In some examples, TLBI instructions can be specified as either "local" or "broadcast." When a local TLBI instruction is issued at a given, originating processing element, the local TLBI instruction causes invalidation of any TLB entries associated with the virtual memory address or context in the TLB of the originating processing element.

When a broadcast TLBI instruction is issued at a given, originating processing element, the broadcast TLBI instruction causes invalidation of any TLB entries associated with the virtual memory address in the TLB of the originating processing element and also causes the TLBI instruction to be sent to one or more other, remote processing elements via the broadcast element. At the one or more remote processing elements, the TLBI instruction issues and causes invalidation of any TLB entries associated with the virtual memory address in the TLBs of the one or more remote processing elements. In some examples, each of the one or more remote processing elements sends an acknowledgement back to the originating processing element via the broadcast element, indicating that the TLBI instruction is complete at the remote processing element.

2.3.2 Global Synchronization of Broadcast TLBI Instructions

In certain situations, it is important that all of the broadcast TLBI instructions issued by an originating processing element are completed before the originating processing element issues any further instructions. To accomplish this, a data synchronization barrier (DSB) instruction can be issued at the originating processing element to suspend processing at the originating processing element until all TLBI instructions issued at the originating processing element, including any broadcast TLBI instructions, are completed. When a DSB instruction is issued after one or more broadcast TLBI instructions a synchronization instruction is broadcast to the remote processing elements and processing is suspended at the originating processing element until all local TLBI instructions have completed and an acknowledgement is received indicating that the broadcast TLBI instructions have completed at the remote processing elements.

In some examples, the remote processing elements can send individual acknowledgements back to the originating processing element upon completion of each TLBI instruction that was received from the originating processing element. However, when a large number of TLBI instructions are broadcast from the originating processing element, an undesirably large number of acknowledgements are sent back to the originating processing element via the broadcast element. This undesirably large number of acknowledgements can consume an excessive amount of bandwidth on the processing bus.

To avoid sending large number of acknowledgements via the processing bus, the approaches described herein essentially consolidate the acknowledgements at each of the remote processing elements into a single acknowledgement for each remote processing element. The consolidated acknowledgements are sent back to the broadcast block, which in turn sends an acknowledgement to the originating processing element indicating that all broadcast TLBI instructions issued at the originating processing element prior to issuance of the DSB instruction are complete at all remote processing elements.

2.3.2.1 Example

Figure 3:
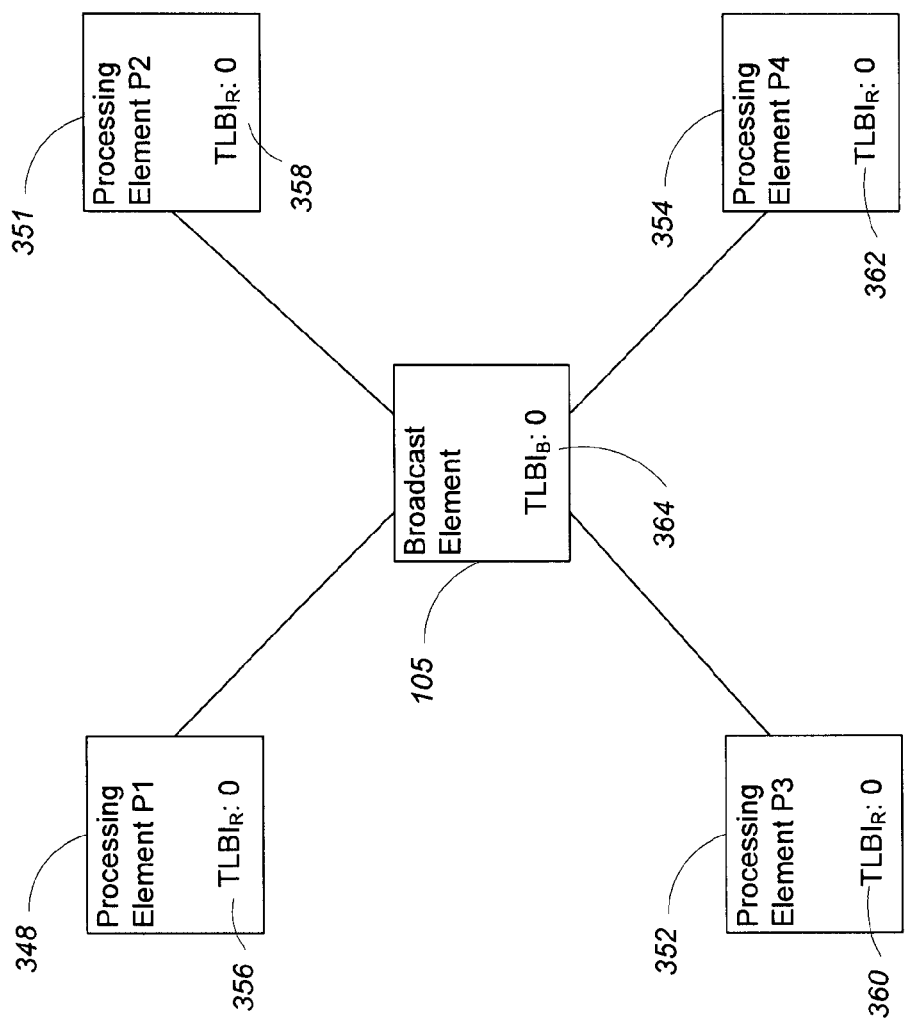
FIG. 3 is a first simplified view of the computing system of FIG. 1.

Referring to FIG. 3, a simplified version 300 of the computing system 100 includes four processing elements (i.e., a first processing element 348, a second processing element 351, a third processing element 352, and a fourth processing element 354) and the broadcast element 105.

Each processing element includes a TLB (not shown), each including a number of TLB entries, each of which includes a mapping between a virtual memory address and a physical memory address. Each processing element also includes a remote TLBI counter ($TLIB_R$). That is, the first processing element 348 includes a first remote TLBI counter 356, the second processing element 348 includes a second remote TLBI counter 358, the third processing element 352 includes a third remote TLBI counter 360, and the fourth processing element 354 includes a fourth remote TLBI counter 362. For each processing element, the remote TLBI counter indicates a number of TLBI instructions in its processing pipeline that were received from remote processing elements. Initially, all of the remote TLBI counters 356, 358, 360, 362 have a value of '0.'

Each of the processing elements 348, 351, 352, 354 is in communication with the broadcast element 105, through which they are able to communicate with one another. The broadcast element 105 includes a broadcast TLBI instruction counter ($TLBI_B$) 364 that indicates a number of broadcast TLBIs that have been broadcast by the broadcast element 105 since the broadcast element 105 last received a synchronization instruction. While not explicitly shown in the figure, all communications between the processing elements and the broadcast element 105 take place over the processing bus 112.

Figure 4:
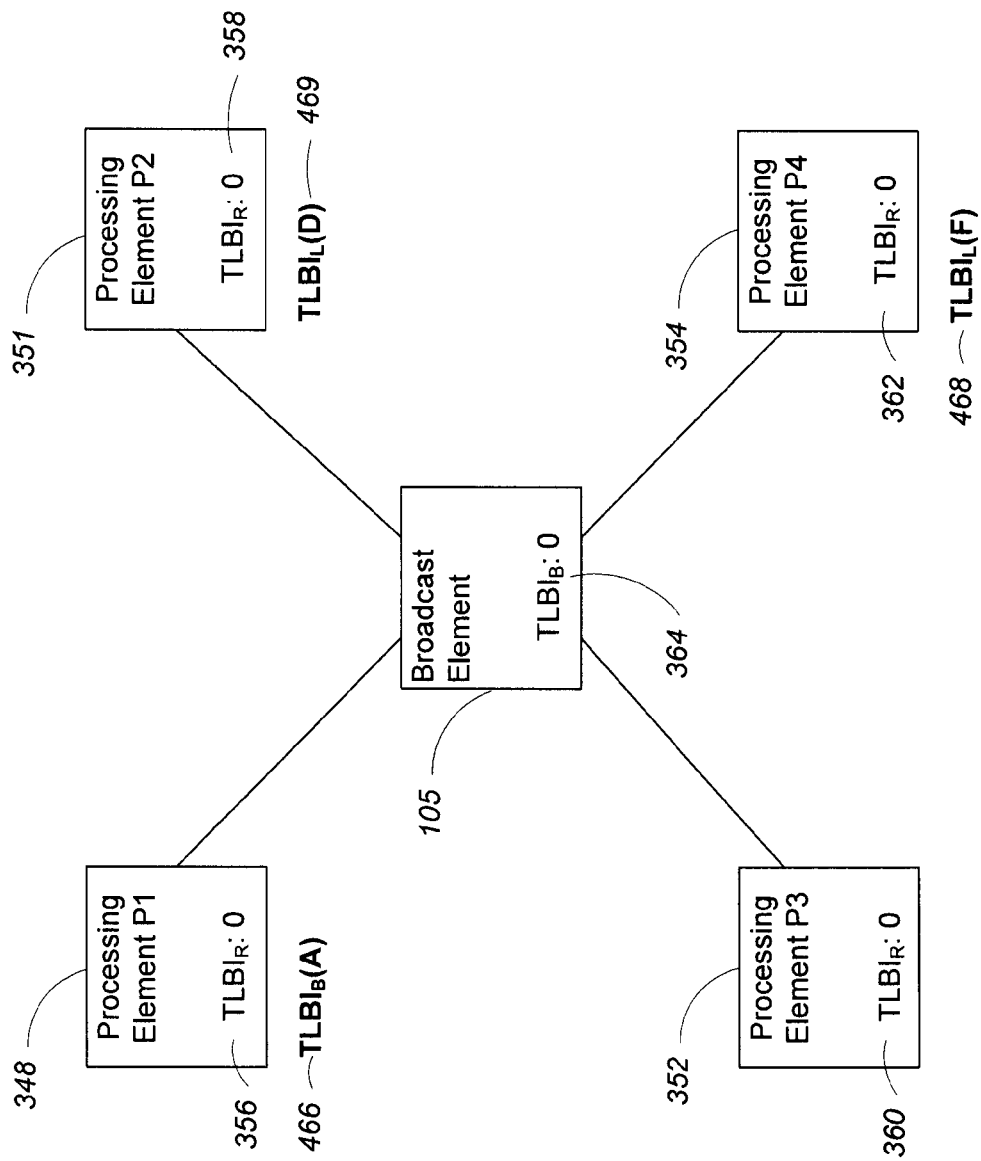
FIG. 4 shows a first execution step in the computing system of FIG. 3.

Referring to FIG. 4, at a first time, a first broadcast TLBI instruction, $TLBI_B(A)$ 466 is issued at the first processing element 348 (i.e., the originating processing element) and a first local TLBI instruction, $TLBI_L(F)$ 468 at the fourth processing element 354. Note that none of the remote TLBI counters 356, 358, 360, 362 are incremented at the first time, since no TLBI has yet been broadcast.

Figure 5:
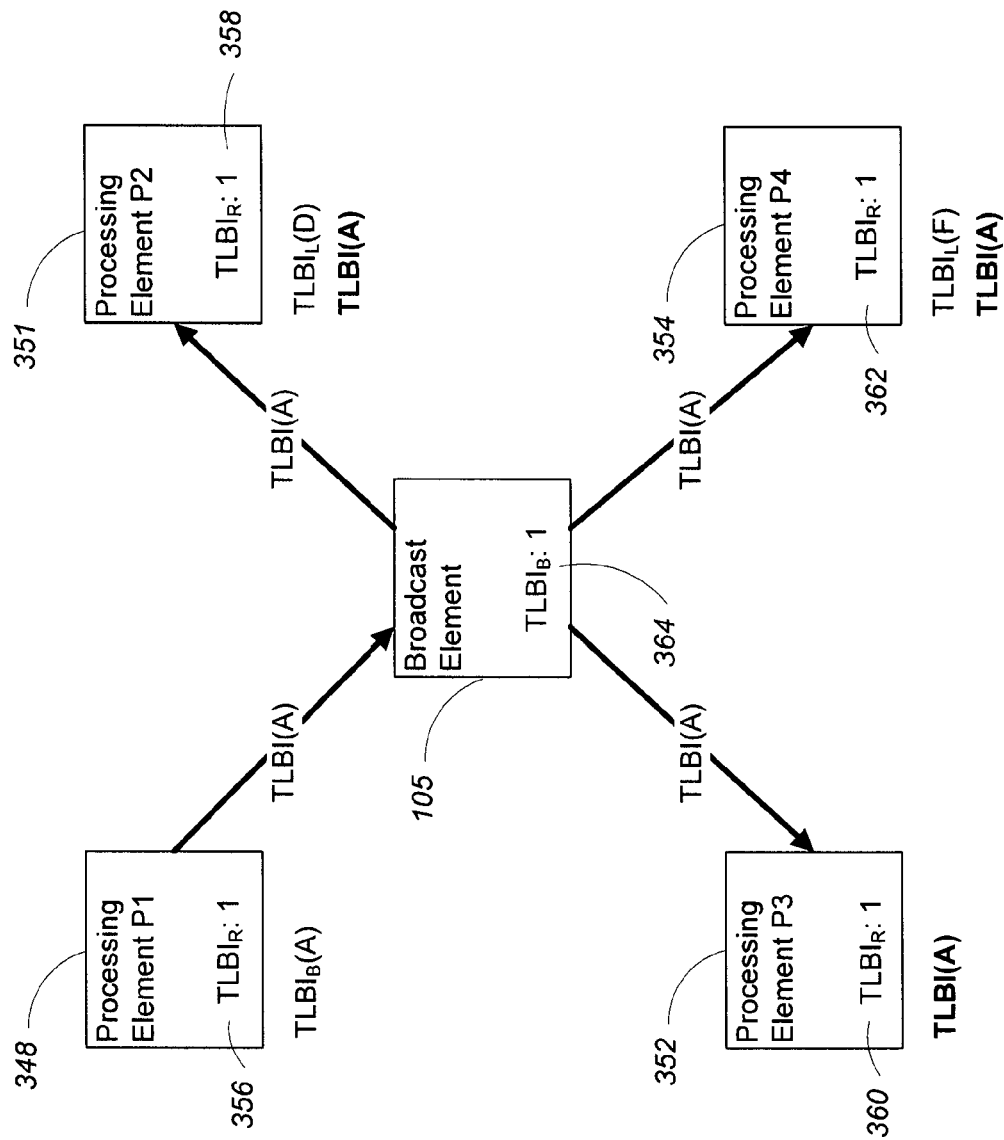
FIG. 5 shows a second execution step in the computing system of FIG. 3.

Referring to FIG. 5, at a second, subsequent time, the first processing element 348 sends a TLBI instruction, TLBI(A) corresponding to the first broadcast TLBI instruction 466 to the broadcast element 105. The first processing element 348 increments its remote TLBI counter 356 to '1,' indicating that it has issued one broadcast TLBI instruction. The broadcast element 105 then increments its broadcast TLBI instruction counter 364 to '1' and sends the TLBI instruction, TLBI(A), to each of the other, remote processing elements 351, 352, 354. Upon receiving the TLBI instruction, TLBI(A), the remote processing elements 351, 352, 354 add the TLBI instruction, TLBI(A) to their respective processing pipelines and increment their respective remote TLBI counters 358, 360, 362 to '1.' Note that the TLBI instruction, TLBI(A) is added after any TLBI instructions already in the processing pipelines of the remote processing elements 351, 352, 354.

Figure 6:
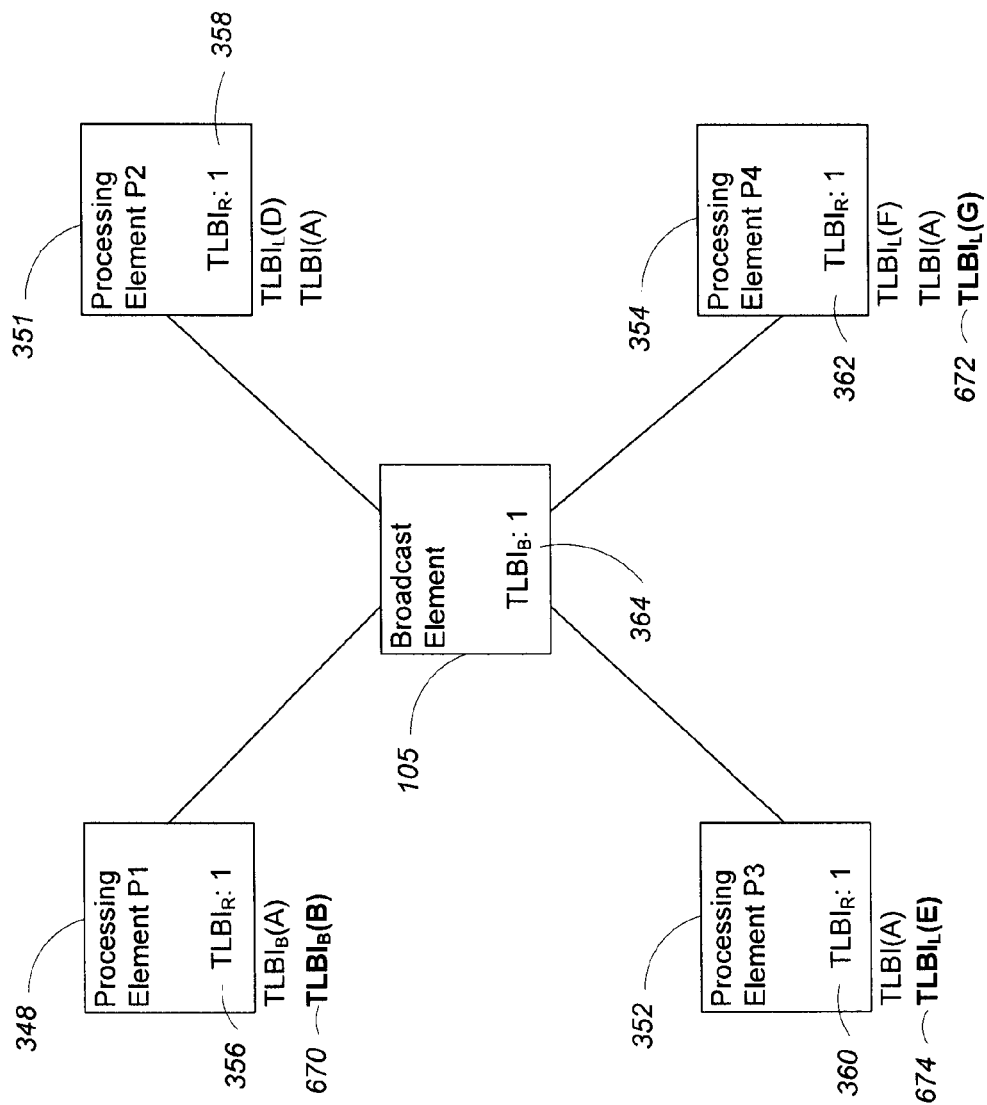
FIG. 6 shows a third execution step in the computing system of FIG. 3.

Referring to FIG. 6, at a third, subsequent time, a second broadcast TLBI instruction, $TLBI_B(B)$, 670 is issued at the first processing element, 348, a second local TLBI instruction, $TLBI_L(E)$ 674 is issued at the third processing element 352, and a third local TLBI instruction, $TLBI_L(G)$ 672 is issued at the fourth processing element 354.

Figure 7:
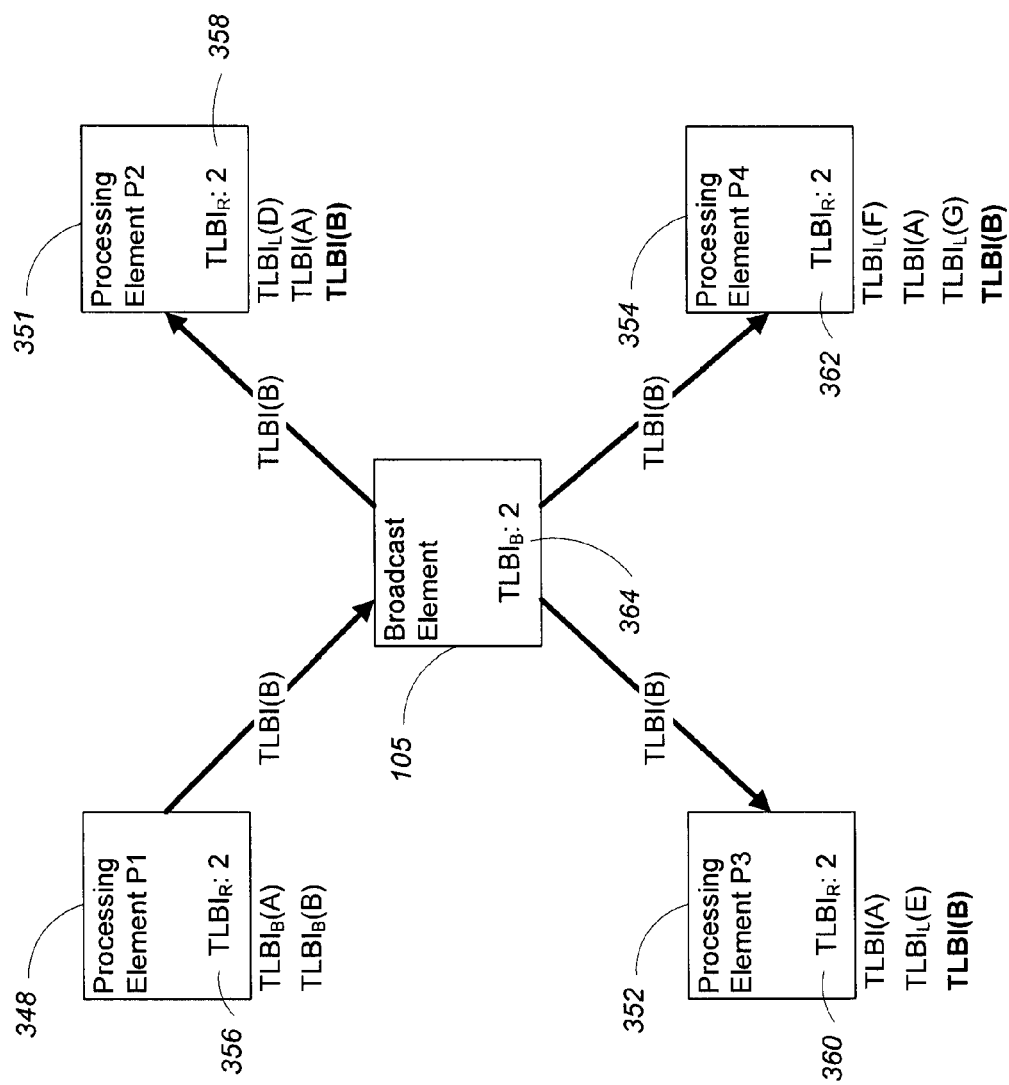
FIG. 7 shows a fourth execution step in the computing system of FIG. 3.

Referring to FIG. 7, at a fourth, subsequent time, the first processing element 348 sends a TLBI instruction, TLBI(B) corresponding to the second broadcast TLBI instruction 670 to the broadcast element 105. The first processing element 348 increments its remote TLBI counter 356 to '2,' indicating that it has issued two broadcast TLBI instructions. The broadcast element 105 then increments its broadcast TLBI instruction counter 364 to '2' and sends the TLBI instruction, TLBI(B), to each of the other, remote processing elements 351, 352, 354. Upon receiving the TLBI instruction, TLBI(B), the remote processing elements 351, 352, 354 add the TLBI instruction, TLBI(B) to their respective processing pipelines and increment their respective remote TLBI counters 358, 360, 362 to '2.' Again, the TLBI instruction, TLBI(B) is added after any TLBI instructions already in the processing pipelines of the remote processing elements 351, 352, 354.

Figure 8:
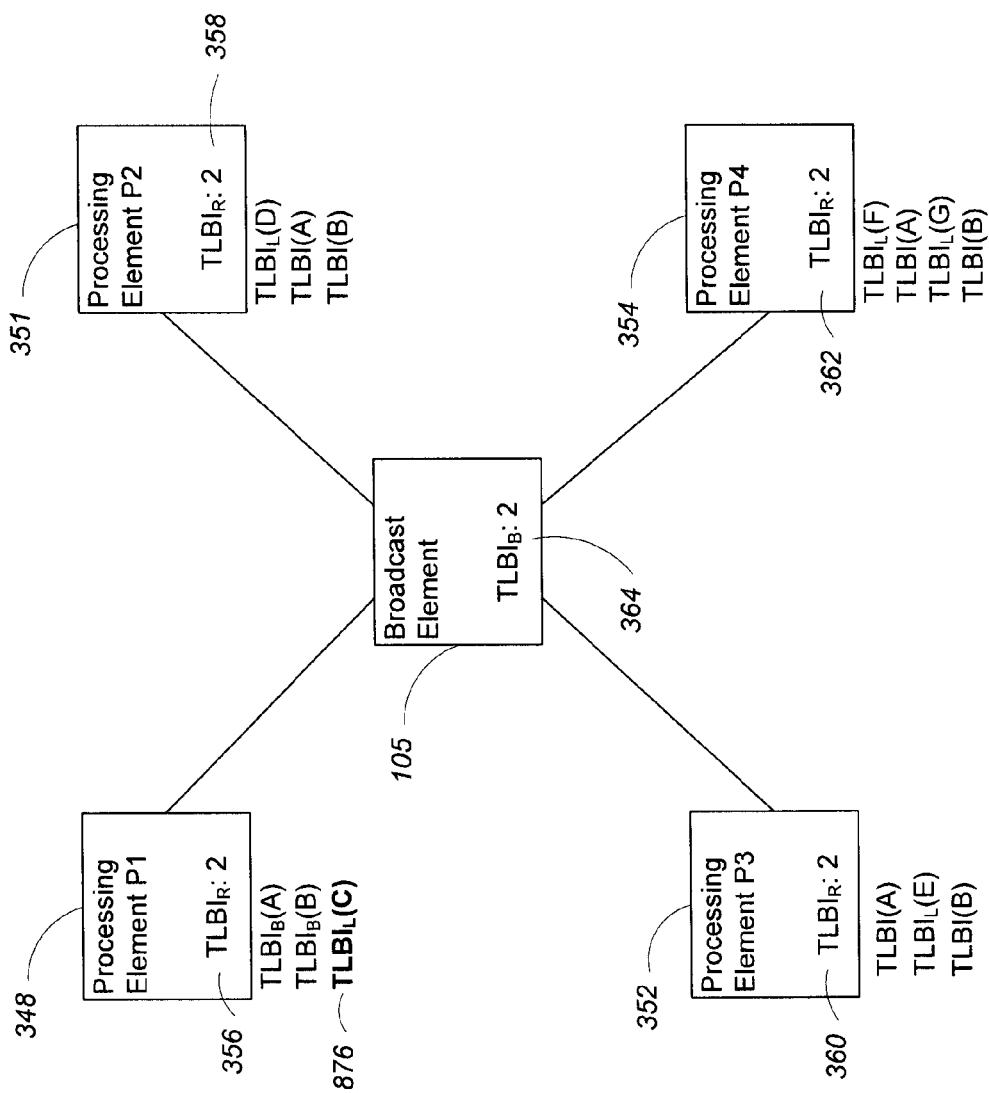
FIG. 8 shows a fifth execution step in the computing system of FIG. 3.
Figure 9:
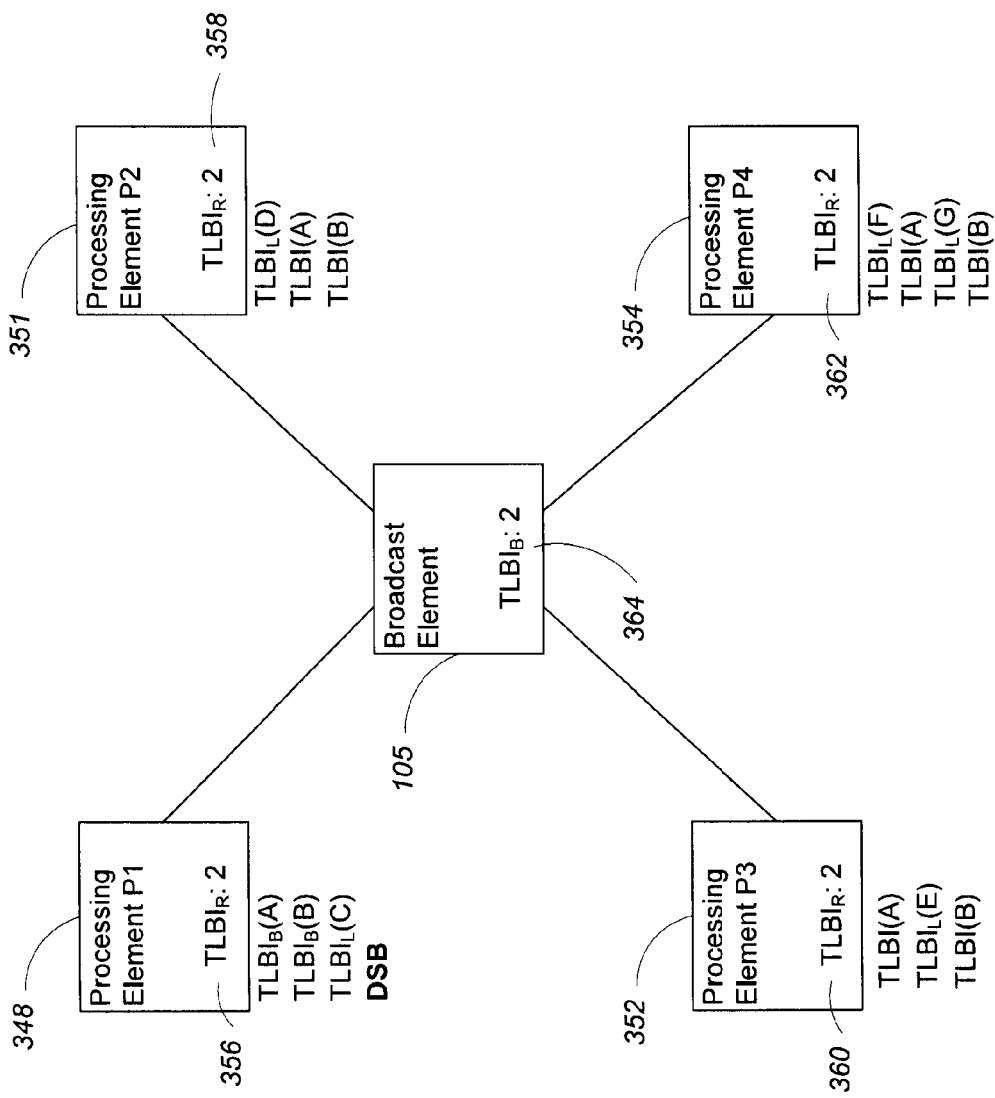
FIG. 9 shows a sixth execution step in the computing system of FIG. 3.
Figure 10:
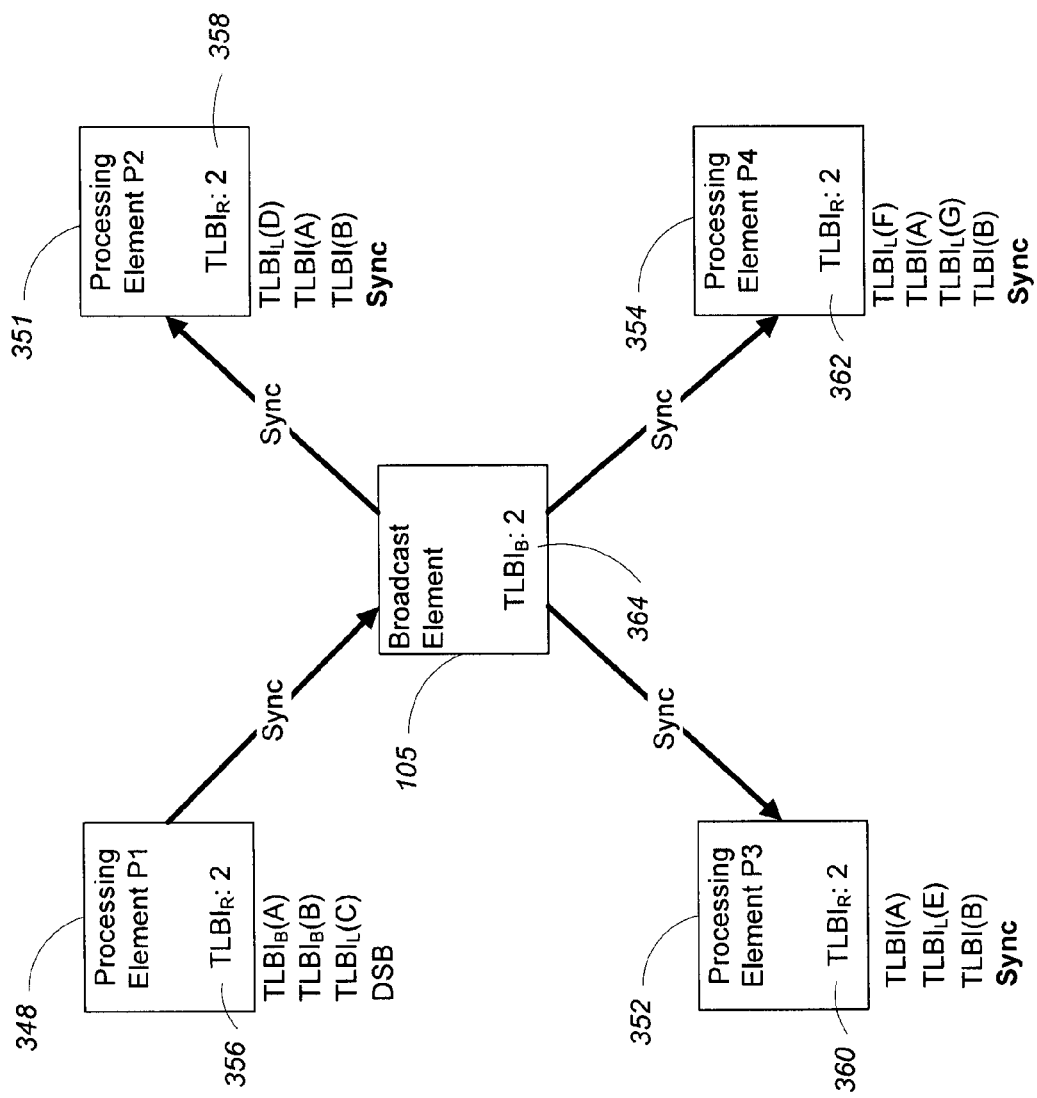
FIG. 10 shows a seventh execution step in the computing system of FIG. 3.

Referring to FIG. 8, at a fourth, subsequent time, a fourth local TLBI instruction, $TLBI_L(C)$ 876 is issued at the first processing element 348. Referring to FIG. 9, at a sixth, subsequent time, a DSB instruction 876 is issued at the first processing element 348. The DSB instruction causes the first processing element 348 to determine whether one or more remote TLBI instructions were issued by the first processing element prior to issuance of the DSB. To do so, the first processing element 348 determines whether its remote TLBI counter 356 is greater than zero. Since the remote TLBI counter 356 is greater than zero (i.e., 2), the DSB instruction causes the first processing element 348 to halt processing until all of the TLBI instructions broadcast by the first processing element 348 have completed. Referring to FIG. 10, to this end, the DSB instruction 857 causes a synchronization instruction ('Sync') to be sent to the broadcast element 105. When the broadcast element 105 receives the synchronization instruction, it examines its broadcast TLBI instruction counter 364 to determine whether its value is greater than zero. If the broadcast TLBI instruction counter 364 is greater than zero, the broadcast element 105 sends the synchronization instruction to the remote processing elements 351, 352, 354 since there are TLBI instructions in the processing pipelines of the remote processing elements were received at the remote processing elements 351, 352, 354 via the broadcast element 105. If the value of the broadcast TLBI instruction counter 364 is equal to zero, the broadcast element 105 does not send the synchronization instruction to the remote processing elements 351, 352, 354 since there are no TLBI instructions in the processing pipelines of the remote processing elements were received at the remote processing elements 351, 352, 354 via the broadcast element 105.

In this case, the broadcast TLBI instruction counter has a value of '2,' and the synchronization instruction is sent from the broadcast element 105 to the remote processing elements 351, 352, 354.

When the synchronization instruction is received at the remote processing elements 351, 352, 354, the remote processing elements examine their respective remote TLBI counters 358, 360, 362 to determine how many TLBI instructions received from other processing elements prior to the synchronization instruction are outstanding at the remote processing elements. As the outstanding TLBI instructions at the remote processing elements complete, the remote TLBI counters are decremented.

Figure 11:
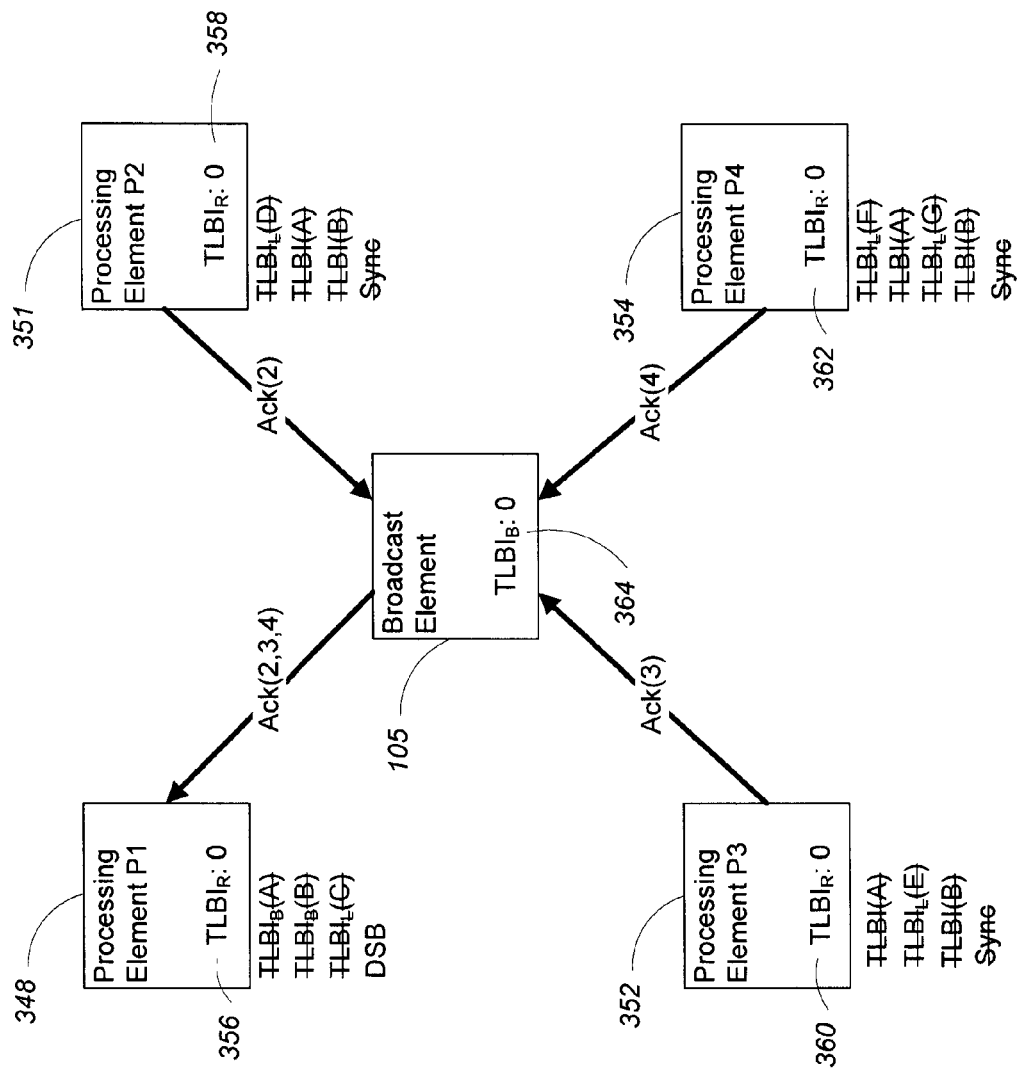
FIG. 11 shows an eighth execution step in the computing system of FIG. 3.

Referring to FIG. 11, once all of the TLBI instructions in the pipelines of the remote processing elements 351, 352, 354 that were issued prior to the synchronization instruction being received at the remote processing elements 351, 352, 354 have completed, the remote processing elements 351, 352, 354 reset their remote TLBI counters 358, 360, 362 and send completion acknowledgements to the broadcast element 105. Once the broadcast element 105 has received completion acknowledgements ('Ack(2),' 'Ack(3),' 'Ack(4)') from each of the remote processing elements 351, 352, 354, it resets its broadcast TLBI instruction counter 364 to zero and sends a completion acknowledgement ('Ack(2,3, 4)') to the first processing element 348. The completion acknowledgement sent from the broadcast element 105 to the first processing element 348 indicates that all broadcast TLBI instructions issued at the first processing element 348 have completed at all of the remote processing elements 351, 352, 354.

After receiving the completion acknowledgement from the broadcast element 105, any broadcast TLBI instructions (e.g., the first broadcast TLBI instruction, $TLBI_B(A)$ 466 and the second broadcast TLBI instruction, $TLBI_B(B)$ 670) are marked as complete.

Figure 12:
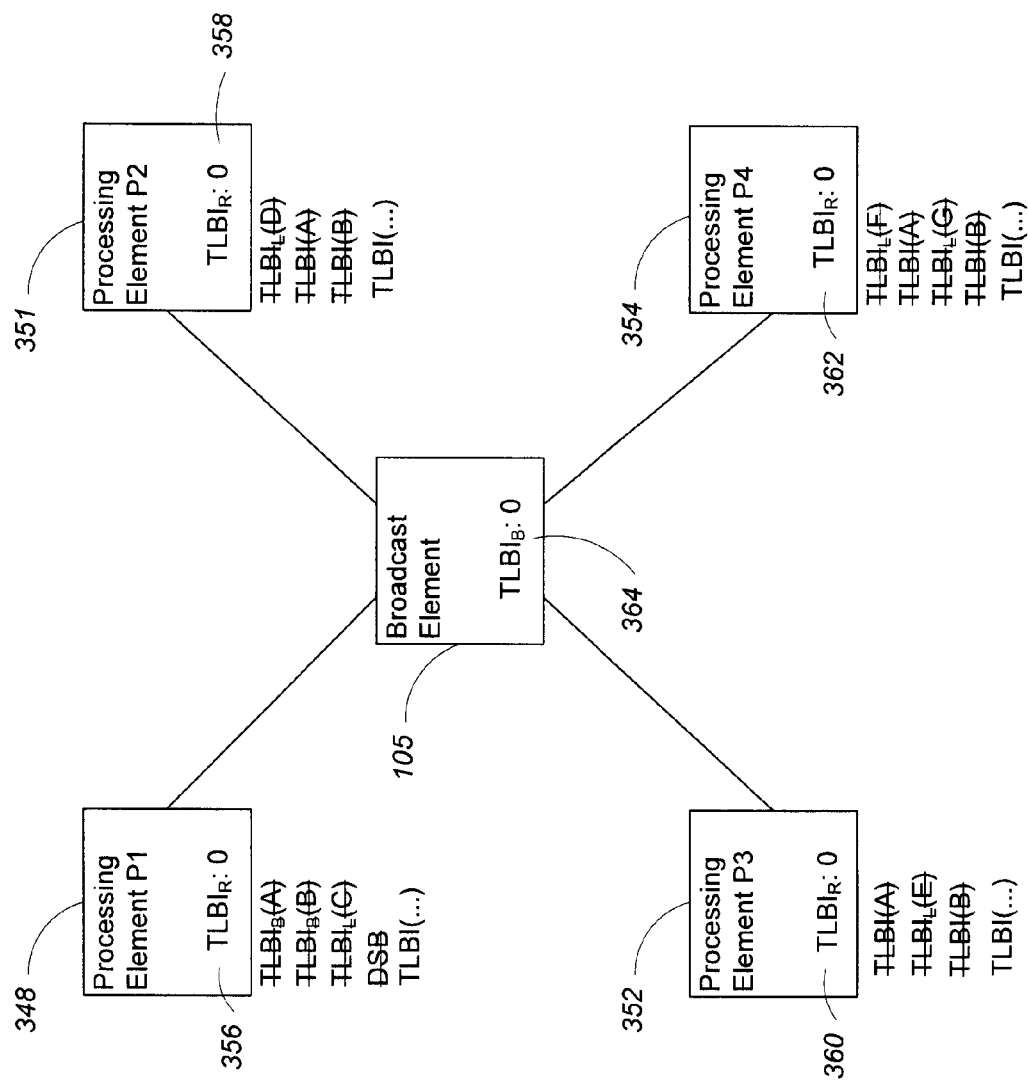
FIG. 12 shows a ninth execution step in the computing system of FIG. 3.

Referring to FIG. 12, with the broadcast TLBI instructions complete at the first processing element 348, once any TLBI instructions issued locally at the first processing element have completed, the DSB instruction is completes and processing resumes at the first processing element 348.

Figure 13:
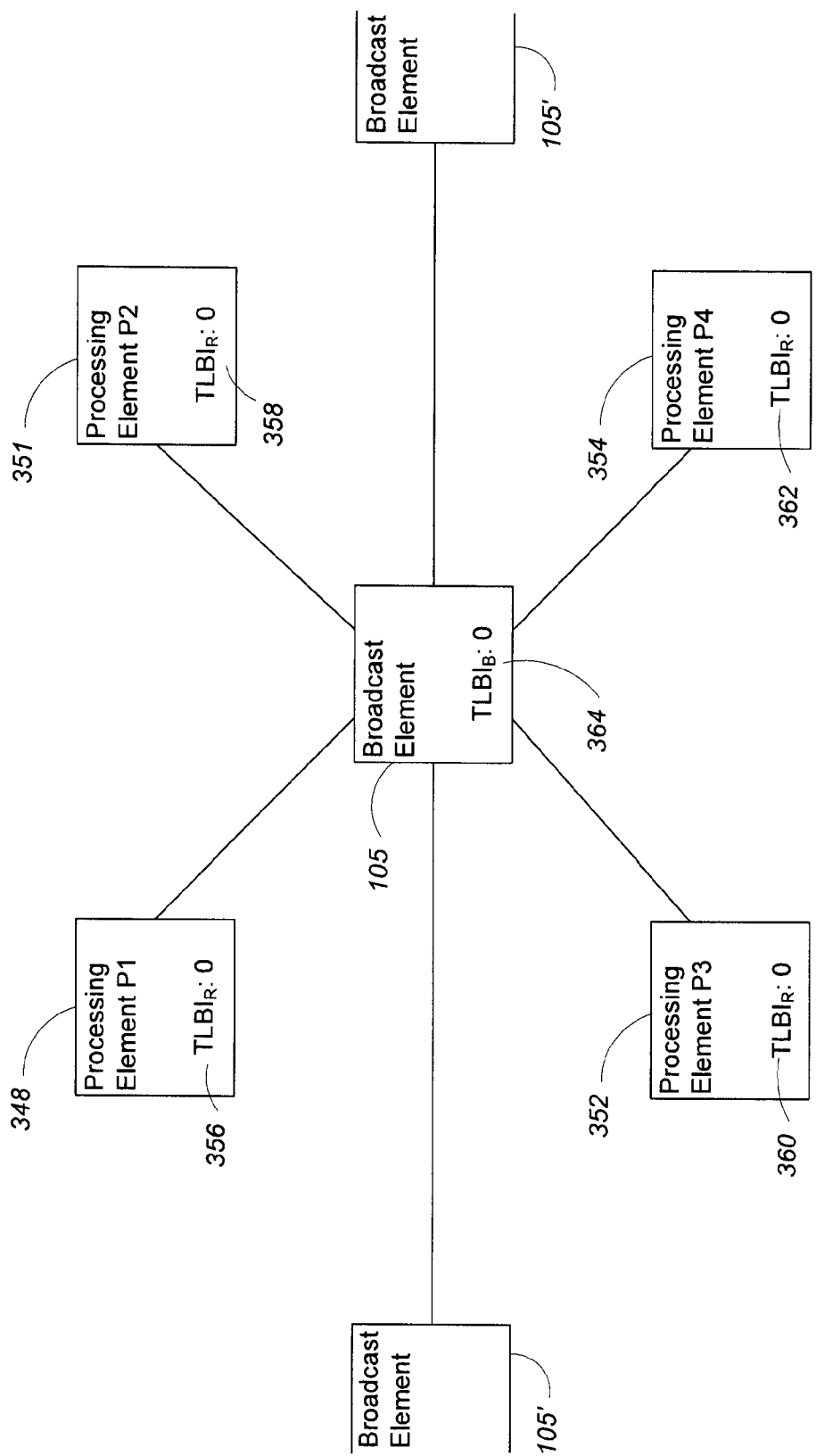
FIG. 13 is a second simplified view of the computing system of FIG. 1, including a number of broadcast elements.

Referring to FIG. 13, in some examples, the computing system 100 may include one or more additional broadcast elements 105', each in communication with a number of additional processing elements (not shown). In general, both TLBI instructions and synchronization instructions can pass between the different broadcast elements 105, 105' and to the processing connected to the different broadcast elements 105, 105'. Any completion acknowledgements can also pass between the different broadcast elements 105, 105' and to the processing elements connected to the different broadcast elements 105, 105'.

In general, all TLBI instructions that have been issued at a remote processing element prior to a time that a synchronization instruction is received at the remote processing element must complete before a completion acknowledgement is sent to the broadcast block.

When a synchronization instruction is received at a remote processing element, the remote processing element does not necessarily suspend processing and may continue issuing instructions.

In some examples, any outstanding write operations related to a mapping that is being invalidated by a TLBI instruction are flushed from a remote processing element's write buffer (or any other place where modified memory data may be held) when a synchronization instruction is received at the remote processing element. In some examples, this is accomplished by flushing the entire write buffer. In other examples, this is accomplished by selectively flushing the write buffer. In some examples, systems that have modified data in their caches may need to have the caches flushed.

In some examples, the broadcast element is included in the L2 cache. In some examples, TLBI instructions are pipelined from an originating, local processing element throughout the rest of the remaining processing elements. In some examples, only a single synchronization instruction can be outstanding for a given processing element at any given time. In some examples, all broadcast TLBI instructions and synchronization instructions are routed through a serialization points such as the last level cache controller.

In some examples, the order in which the TLB and L1 caches care accessed depends on how they are addressed. That is, when an L1 cache is physically tagged, the TLB needs to be accessed prior to the L1 cache. When an L1 cache is virtually tagged, no TLB access is required prior to accessing the L1 cache.

3 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope of the following claims.

What is claimed is:

1. A method for managing a plurality of translation lookaside buffers, each translation lookaside buffer being associated with a corresponding processing element of a plurality of processing elements, the method comprising:

issuing a first translation lookaside buffer invalidation instruction at a first processing element of the plurality of processing elements, and sending the first translation lookaside buffer invalidation instruction to a second processing element of the plurality of processing elements;

receiving translation lookaside buffer invalidation instructions, including the first translation lookaside buffer invalidation instruction, at the second processing element;

issuing an element-specific synchronization instruction at the first processing element, and broadcasting a synchronization command to multiple processing elements, the element-specific synchronization instruction being issued without being broadcast to multiple processing elements and the element-specific synchronization instruction preventing issuance of additional translation lookaside buffer invalidation instructions at the first processing element until an acknowledgement in response to the synchronization command is received at the first processing element;

receiving the synchronization command at the second processing element; and after completion of any translation lookaside buffer invalidation instructions, including the first translation lookaside buffer invalidation instruction, issued at the second processing element before the synchronization command was received at the second processing element, sending the acknowledgement from the second processing element to the first processing element, the acknowledgement indicating that any translation lookaside buffer invalidation instructions, including the first translation lookaside buffer invalidation instruction, issued at the second processing element before the synchronization command was received at the second processing element are complete.

2. The method of claim 1 wherein the acknowledgement indicates that a plurality of translation lookaside buffer invalidation instructions issued at the second processing element before the synchronization command was received at the second processing element are complete.

3. The method of claim 2 wherein two or more translation lookaside buffer invalidation instructions of the plurality of translation lookaside buffer invalidation instructions were received at the second processing element from other processing elements of the plurality of processing elements.

4. The method of claim 1 wherein the acknowledgement further indicates that any write operations present in a write buffer of the second processing element prior to the synchronization command being received at the second processing element are complete.

5. The method of claim 1 wherein sending the first translation lookaside buffer invalidation instruction to the second processing element includes sending the first translation lookaside buffer invalidation instruction to a broadcast element and subsequently sending the first translation lookaside buffer invalidation instruction from the broadcast element to the second processing element.

6. The method of claim 5 wherein the broadcast element maintains a count of translation lookaside buffer invalidation instructions received since the last synchronization command was received.

7. The method of claim 6 further comprising receiving a second synchronization command at the broadcast element and determining whether or not to send the second synchronization command to one or more processing elements of the plurality of processing elements based on the count of translation lookaside buffer invalidation instructions received since the last synchronization command was received.

8. The method of claim 7 further comprising sending the second synchronization command to the one or more processing elements of the plurality of processing elements if the count of translation lookaside buffer invalidation instructions received since the last synchronization command was received is greater than zero and suppressing the second synchronization command if the count of translation lookaside buffer invalidation instructions received since the last synchronization command was received is equal to zero.

9. The method of claim 6 wherein the broadcast element increments the count of translation lookaside buffer invalidation instructions received since the last synchronization command was received upon receiving the first translation lookaside buffer invalidation instruction.

10. The method of claim 5 wherein broadcasting the synchronization command includes sending the synchronization command to the broadcast element and subsequently sending the synchronization command from the broadcast element to the second processing element.

11. The method of claim 10 wherein the broadcast element resets the count of translation lookaside buffer invalidation instructions received since the last synchronization command was received to zero upon receiving the synchronization command.

12. The method of claim 5 further comprising sending the synchronization instruction from the broadcast element to a second broadcast element, wherein the second broadcast element subsequently sends the synchronization instruction to one or more processor elements of a second plurality of processor elements.

13. The method of claim 1 wherein broadcasting the synchronization command includes broadcasting the synchronization command through a broadcast element that maintains a count of translation lookaside buffer invalidation instructions received since the last synchronization command was received.

14. An apparatus comprising:
a plurality of processing elements, each processing element being associated with a corresponding translation lookaside buffer;
wherein a first processing element of the plurality of processing elements is configured to issue a first translation lookaside buffer invalidation instruction, and send the first translation lookaside buffer invalidation instruction to a second processing element of the plurality of processing elements;
wherein the second processing element is configured to receive translation lookaside buffer invalidation instructions, including the first translation lookaside buffer invalidation instruction;
wherein the first processing element is configured to issue an element-specific synchronization instruction, and broadcasting a synchronization command to multiple processing elements, the element-specific synchronization instruction being issued without being broadcast to multiple processing elements and the element-specific synchronization instruction preventing issuance of additional translation lookaside buffer invalidation instructions at the first processing element until an acknowledgement in response to the synchronization command is received at the first processing element;
wherein the second processing element is configured to receive the synchronization command; and
wherein, after completion of any translation lookaside buffer invalidation instructions, including the first translation lookaside buffer invalidation instruction, issued at the second processing element before the synchronization command was received at the second processing element, the second processing element is configured to send the acknowledgement to the first processing element, the acknowledgement indicating that any translation lookaside buffer invalidation instructions, including the first translation lookaside buffer invalidation instruction, issued at the second processing element before the synchronization command was received at the second processing element are complete.

15. The apparatus of claim 14 wherein the acknowledgement indicates that a plurality of translation lookaside buffer invalidation instructions issued at the second processing element before the synchronization command was received at the second processing element are complete.

16. The apparatus of claim 15 wherein two or more translation lookaside buffer invalidation instructions of the plurality of translation lookaside buffer invalidation instructions were received at the second processing element from other processing elements of the plurality of processing elements.

17. The apparatus of claim 14 wherein the acknowledgement further indicates that any write operations present in a write buffer of the second processing element prior to the synchronization command being received at the second processing element are complete.

18. The apparatus of claim 14 wherein sending the first translation lookaside buffer invalidation instruction to the second processing element includes sending the first translation lookaside buffer invalidation instruction to a broadcast element and subsequently sending the first translation lookaside buffer invalidation instruction from the broadcast element to the second processing element.

19. The apparatus of claim 18 wherein the broadcast element maintains a count of translation lookaside buffer invalidation instructions received since the last synchronization command was received.

20. The apparatus of claim 19 wherein the broadcast element is configured to receive a second synchronization command and determine whether or not to send the second synchronization command to one or more processing elements of the plurality of processing elements based on the count of translation lookaside buffer invalidation instructions received since the last synchronization command was received.

21. The apparatus of claim 20 wherein the broadcast element is further configured to send the second synchronization command to the one or more processing elements of the plurality of processing elements if the count of translation lookaside buffer invalidation instructions received since the last synchronization command was received is greater than zero and suppress the second synchronization command if the count of translation lookaside buffer invalidation instructions received since the last synchronization command was received is equal to zero.

22. The apparatus of claim 19 wherein the broadcast element increments the count of translation lookaside buffer invalidation instructions received since the last synchronization command was received upon receiving the first translation lookaside buffer invalidation instruction.

23. The apparatus of claim 18 wherein broadcasting the synchronization command includes sending the synchronization command to the broadcast element and subsequently sending the synchronization command from the broadcast element to the second processing element.

24. The apparatus of claim 23 wherein the broadcast element resets the count of translation lookaside buffer invalidation instructions received since the last synchronization command was received to zero upon receiving the synchronization command.

25. The apparatus of claim 18 wherein the broadcast element is configured to send the synchronization instruction to a second broadcast element, wherein the second broadcast element subsequently sends the synchronization instruction to one or more processor elements of a second plurality of processor elements.

26. The apparatus of claim 14 wherein broadcasting the synchronization command includes broadcasting the synchronization command through a broadcast element that maintains a count of translation lookaside buffer invalidation instructions received since the last synchronization command was received.

\* \* \* \* \*